(12) United States Patent
Ho et al.

(10) Patent No.: US 7,986,743 B2
(45) Date of Patent: Jul. 26, 2011

(54) METHOD FOR TRANSMITTING A DIGITAL DATA STREAM, TRANSMITTER, METHOD FOR RECEIVING A DIGITAL DATA STREAM AND RECEIVER

(75) Inventors: Chin Keong Ho, Singapore (SG); Yan Wu, Singapore (SG); Sumei Sun, Singapore (SG); Zhongding Lei, Singapore (SG); Ho Wang Fung, Singapore (SG); Ying Chang Liang, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 692 days.

(21) Appl. No.: 11/573,146

(22) PCT Filed: Aug. 3, 2005

(86) PCT No.: PCT/SG2005/000266
§ 371 (c)(1),
(2), (4) Date: Nov. 27, 2007

(87) PCT Pub. No.: WO2006/014143
PCT Pub. Date: Feb. 9, 2006

(65) Prior Publication Data
US 2008/0095262 A1    Apr. 24, 2008

(51) Int. Cl.
*H04B 7/02* (2006.01)
(52) U.S. Cl. ........ 375/267; 375/260; 375/295; 375/299; 455/101; 455/132; 455/296; 370/203; 370/204; 370/206; 370/208; 370/210

(58) Field of Classification Search .................. 375/260, 375/295, 299, 267; 455/101, 132, 296; 370/203, 370/204, 206, 208, 210
See application file for complete search history.

(56) References Cited

U.S. PATENT DOCUMENTS

| | | | |
|---|---|---|---|
| 6,377,632 B1 * | 4/2002 | Paulraj et al. | 375/299 |
| 6,618,454 B1 | 9/2003 | Agrawal et al. | |
| 6,952,454 B1 * | 10/2005 | Jalali et al. | 375/260 |
| 7,020,072 B1 | 3/2006 | Li et al. | |
| 7,436,896 B2 * | 10/2008 | Hottinen et al. | 375/267 |

(Continued)

FOREIGN PATENT DOCUMENTS

EP    1469613    4/2003

(Continued)

OTHER PUBLICATIONS

G. J. Foschini, G. D Golden, R. A. Valenzuela, and P.W. Wolnianski, "Simplified processing for high speed spectral efficiency wireless communication employing multi-element arrays," *IEEE Journal on Selected Areas of Communications*, vol. 17, No. 11, pp. 1841-1852.

(Continued)

*Primary Examiner* — Leon Flores
(74) *Attorney, Agent, or Firm* — K. David Crockett, Esq.; Niky Economy Syrengelas, Esq.; Crockett & Crockett, PC

(57) ABSTRACT

A method for transmitting a digital signal is described, wherein the digital signal is to be transmitted by a plurality of antennas and a 2-domain pre-transformation is carried out, i.e., in course of a pre-transformation modulation symbols assigned to subcarriers having different frequencies and assigned to subcarriers sent by different antennas are linearly combined.

13 Claims, 6 Drawing Sheets

U.S. PATENT DOCUMENTS

| | | | |
|---|---|---|---|
| 7,801,247 B2* | 9/2010 | Onggosanusi et al. ....... | 375/299 |
| 2001/0033623 A1 | 10/2001 | Hosur | |
| 2001/0053143 A1 | 12/2001 | Li et al. | |
| 2003/0138058 A1 | 7/2003 | Agrawal et al. | |
| 2004/0052315 A1* | 3/2004 | Thielecke et al. ............ | 375/299 |

FOREIGN PATENT DOCUMENTS

| | | |
|---|---|---|
| JP | 2002009735 | 1/2002 |
| JP | 200244051 | 2/2002 |

OTHER PUBLICATIONS

Zhongding Lei, Yan Wu, Chin Keong Ho, Sumei Sun, Ping He and Yuan Li, "Iterative detection for Walsh-Hadamard transformed OFDM," *IEEE Vehicular Technology Conference Spring*, 2003, pp. 637-640, vol. 1, Apr. 2003.

Texas Instruments. Improved Double-STTD Schemes Using Asymmetric Modulation and Antenna Shuffling.TSG-R WG1 document, TSGR1#20(01)0459, May 21-25, 2001, Busan, Korea.

Maxime Guillaud et. al., Multi-Stream Coding for MIMO OFDM Systems with Space-Time-Frequency Spreading, Wireless Personal Multimedia Communications, 2002 IEEE, Oct. 30, 2002, vol. 1, pp. 120-124.

Yoon Eunchul, Hansen Jan, Paulraj Arogyaswami, Space Frequency Precoding for an OFDM based System Exploiting Spatial and Path Correlation, Information Systems laboratory, Stanford University.

Torabi, et al., A New Space-Frequency-Time Block Coded OFDM Scheme for Broadband Wireless Communications, IIEEE Canadian Conference 247 (IEEE 2003).

\* cited by examiner

METHOD FOR TRANSMITTING A DIGITAL DATA STREAM, TRANSMITTER, METHOD FOR RECEIVING A DIGITAL DATA STREAM AND RECEIVER

FIELD OF THE INVENTION

The invention relates to a method for transmitting a digital data stream, a transmitter, a method for receiving a digital data stream and a receiver.

BACKGROUND OF THE INVENTION

In mobile communications, high user capacities and high data rates are desirable. To achieve this, mobile radio systems have to be highly spectral efficient. Using multicarrier modulation according to OFDM (orthogonal frequency division multiplexing), robust performance and high spectral efficiency can be achieved.

Before the OFDM modulation, a pre-transform can be carried out, resulting in a so-called PT-OFDM (pre-transform OFDM) system.

OFDM can be applied for MIMO (multiple input multiple output) systems. A MIMO system uses a plurality of transmit antennas (i.e. sending antennas) and receiver antennas to transmit and receive data. An example for MIMO is the VBLAST (Vertical Bell LAb's Layered Space Time) architecture described in [1]. When OFDM is combined with the VBLAST architecture, high data rate transmission can be achieved in frequency selective fading channels. It was shown in [2] that frequency diversity in a PT-OFDM system can be exploited through simple linear processing.

When the VBLAST architecture is combined with OFDM, the input data stream is modulated and assigned to different transmit antennas through serial to parallel conversion. At each transmit antenna, the data are partitioned into blocks $x_i$ of size K with element $x_i(m)$ indicating the mth signal in the block transmitted on transmit antenna i. $x_i$ is then pre-transformed using a PT (pre-transform) matrix T according to $$x_{T,i} = Tx_i.$$

The pre-transformed signal is modulated according to OFDM using inverse Fast Fourier Transform (IFFT), appended with cyclic prefix (CP) and transmitted via the respective transmit antennas. The channel of the system is modeled as uncorrelated multi-path fading channel between each transmit and receive antenna pair.

A PT-MIMO-OFDM system, i.e. a MIMO system using OFDM and a pre-transform, with N transmit antennas, M receive antennas and K subcarriers can be formulated as $$R = \begin{bmatrix} H_{1,1} & H_{1,2} & \cdots & H_{1,N} \\ H_{2,1} & H_{2,2} & \cdots & H_{2,N} \\ \vdots & \vdots & \ddots & \vdots \\ H_{M,1} & H_{M,3} & \cdots & H_{M,N} \end{bmatrix} \begin{bmatrix} T & 0 & \cdots & 0 \\ 0 & T & \cdots & 0 \\ \vdots & \vdots & \ddots & \vdots \\ 0 & 0 & \cdots & T \end{bmatrix} \begin{bmatrix} x_1 \\ x_2 \\ \vdots \\ x_N \end{bmatrix} + \begin{bmatrix} N_1 \\ N_2 \\ \vdots \\ N_M \end{bmatrix}$$

where $H_{i,j}$ is a K×K diagonal matrix corresponding to the single input single output frequency response of all the subcarriers between transmit antenna j and receive antenna i. T is the pre-transform matrix of size K×K and $x_j$ is the data symbol transmitted at antenna j and $N_i$ is the AWGN noise vector at receive antenna i.

At the receiver, the received data is first transformed to frequency domain using Fast Fourier Transform (FFT) on each receive antenna. On the mth subcarrier, the received signal can be written as $$r(m) = H(m)x_T(m) + n(m)$$

where H(m) is the equivalent MIMO channel on subcarrier m, $x_T(m)$ is a vector formed by stacking the mth element of $x_{T,i}$ for i=1, . . . , M.

There are several existing detection methods for PT-MIMO-OFDM systems:

1) Linear Detection in Both Space and Frequency

In this approach, spatial domain interference suppression (IS) is first performed to separate different signals from different transmit antennas. ZF-IS (zero forcing IS) is performed as $$y(m)H(m)^{-1}r(m) = x_T(m) + H(m)^{-1}n(m)$$

where $H(m)^{-1}$ indicates generalized inverse of H(m). The MMSE-IS (minimum mean square error IS) is performed as $$y(m) = H^H(m)[H(m)H^H(m)\sigma_x^2 + \sigma_n^2 I_M]^{-1}r(m)$$

where $\sigma_x^2$ is the variance of the transmitted signal and $\sigma_n^2$ is the variance of the noise. $I_M$ indicates the identity matrix of size M. On each receive antenna, after MIMO processing, we have an PT-OFDM system. The decision statistic of the transmitted signal can be formed by inverse transform of $y_i$ for i=1, 2, . . . , M:

$$d_i = T^H y_i$$

The advantage of this approach is its simplicity in processing. However, the problem with this approach is that neither space nor frequency diversity of the system is fully exploited. The performance is rather poor.

2) Joint Maximal Likelihood (ML) Detection Over Space and Frequency

In this approach, ML detection is carried out across both frequency and space. The advantage of the method is that the performance is good as both space and frequency is fully exploited. The complexity of this method, however, is exponential with the product of number of transmit antennas and the transform size. It is not feasible for practical implementations.

3) Spatial Domain Interference Cancellation

In this approach, linear detection is carried out, first, to obtain an estimate of the transmitted signal. Then, parallel interference cancellation and maximal ratio combining (PIC+MRC) technique is used to exploit the spatial diversity in the system.

From the decision output of the linear detector, the estimate of the transformed signal on subcarrier m, $\hat{x}_T(m)$, can be obtained. The interference cancellation for $x_{T,i}(m)$ can be performed as $$r_i^{IC}(m) = \underline{r}(m) - \sum_{j=1, j \neq i}^{M} \underline{h}_j(m)\hat{x}_{T,i}(m) + \underline{n}(m)$$

$$= \underline{h}_i(m)x_{T,i}(m) + \sum_{j=1, j \neq i}^{M} \underline{h}_j(m)[x_{T,i}(m) - \hat{x}_{T,i}(m)] + \underline{n}(m)$$

where $h_j(m)$ denotes the jth column of $H(m)$. If it is assumed that the interference cancellation is perfect, i.e.

$$\sum_{j=1,j\neq i}^{M} \underline{h}_j(m) \, [x_{T,i}(m) - \hat{x}_{T,j}(m)] = 0$$

one has a receive diversity system with N receive antennas. Therefore, MRC can be performed on $r_i^{IC}(m)$ such that $$y_i(m) = h_i^H(m) r_i^{IC}(m)$$

The problem with this approach is the error propagation. Decision errors in the previous iteration of detection affect the performance in the subsequent steps. For a system with smaller transform size and higher modulations (like 16 QAM), this error propagation affects the system performance significantly.

An object of the invention is to increase the performance of existing transmitting methods.

The object is solved by a method for transmitting a digital data stream, a transmitter, a method for receiving a digital data stream and a receiver with the features according to the independent claims.

SUMMARY OF THE INVENTION

A method for transmitting a digital data stream is provided, wherein the data stream is mapped to a plurality of modulation symbols and each modulation symbol is associated with a subcarrier of a multiplicity of subcarriers. The multiplicity of subcarriers comprises at least a first plurality of subcarriers and a second plurality of subcarriers wherein the subcarriers of the first plurality of subcarriers have different frequency and are sent by a first antenna and the subcarriers of the second plurality of subcarriers have different frequency and are sent by a second antenna. The modulation symbols are transformed such that a multiplicity of transformed modulation symbols is formed from the modulation symbols wherein at least two modulation symbols associated with sub-carriers having different frequency are linearly combined to form a transformed modulation symbol and at least one modulation symbol associated with a subcarrier sent by the first antenna and at least one modulation symbol associated with a sub-carrier sent by the second antenna are linearly combined to form a transformed modulation symbol and each transformed modulation symbol is associated with a subcarrier.

Each transformed modulation symbol is used to modulate the subcarrier associated with the transformed modulation symbol.

Further, a transmitter, a method for receiving a digital data stream and a receiver according to the method for transmitting a digital data stream described above are provided.

SHORT DESCRIPTION OF THE FIGURES

DETAILED DESCRIPTION

Illustratively, a 2-domain (2D) pre-transformation is carried out that combines modulation symbols of different subcarriers sent by the same antenna (this corresponds to a pre-transformation in the frequency domain) as well as modulation symbols of different antennas (this corresponds to a pre-transformation in the spatial domain). In particular, modulation symbols corresponding to different data streams (to be transmitted using different antennas) can be combined in this way.

In this way, performance of the transmission of the data stream can be increased with respect to prior art methods.

The invention can for example be used in communication systems according to WLAN 11n, WIMAX (Worldwide Interoperability for Microwave Access), B3G (beyond 3G), ADSL (asynchronous digital subscriber line). It can be used in combination with OFDM (orthogonal frequency division multiplexing), SC-FDE (single carrier with frequency domain equalization) and OFDMA (orthogonal frequency division multiple access).

The methods according to the invention can be carried out by a computer that is provided the necessary instructions e.g. in form of a computer program.

Embodiments of the invention arise from the dependent claims. Embodiments that are described in the context of the method for transmitting a digital data stream are also valid for the transmitter, the method for receiving a digital data stream and the receiver.

In one embodiment, the modulation symbols are grouped into at least one block.

A block of modulation symbols is for example transformed to a block of transformed modulation symbols according to the multiplication by a transform matrix. The transform matrix is, in one embodiment, unitary.

The transformed modulation symbols are for example used for OFDM modulation of the subcarriers.

A forward error correction coding can be carried out on the data stream before it is mapped to the modulation symbols. The data stream can be interleaved before it is mapped to the modulation symbols. The data stream can also be scrambled before it is mapped to the modulation symbols. An STBC (space time block code) encoding can be carried out.

Figure 1:
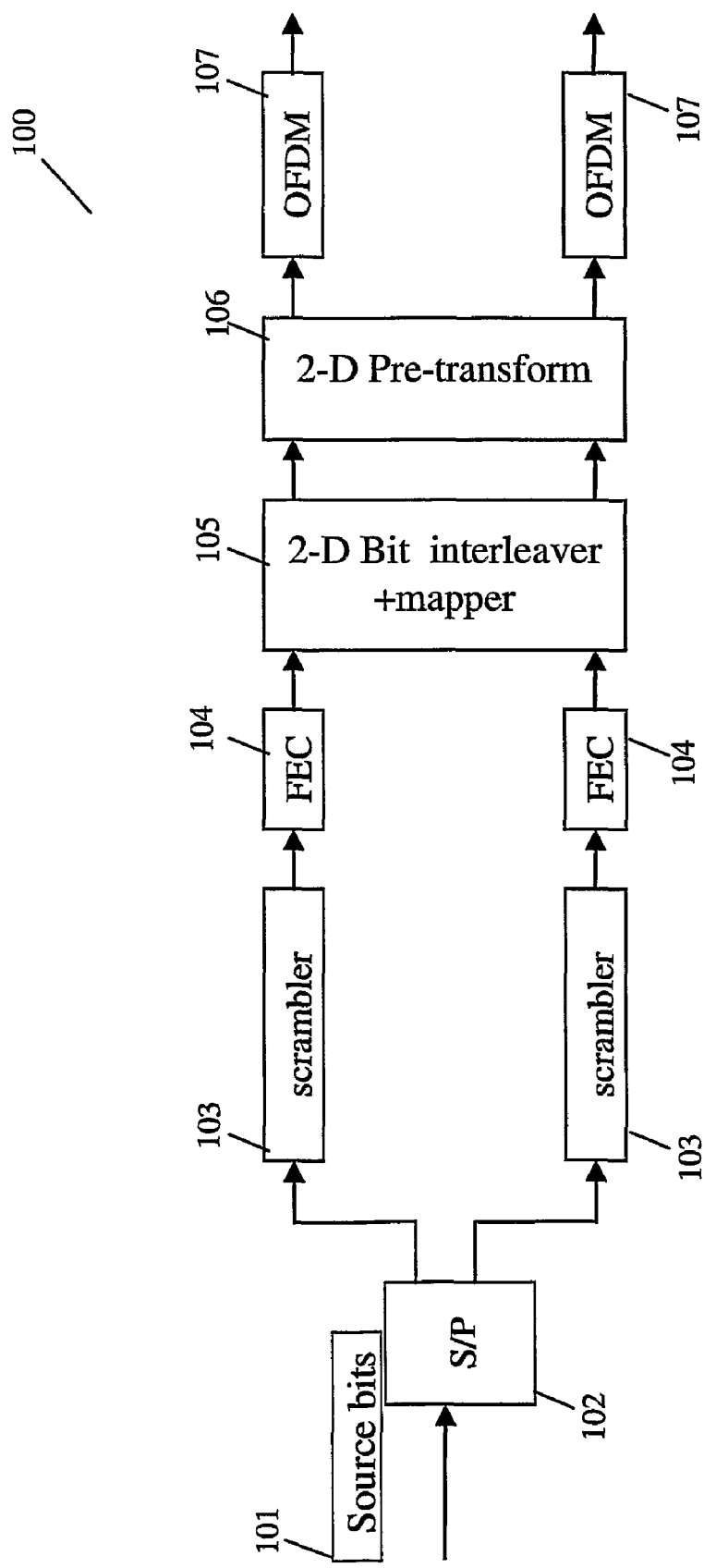
FIG. 1 shows a transmitter according to an embodiment of the invention.

FIG. 1 shows a transmitter 100 according to an embodiment of the invention.

The transmitter 100 is formed according to a S×S SM (spatial multiplexing) PT-FEC-coded (pre-transform forward error correction coded) OFDM (orthogonal frequency multiplexing) system. The data 101 to be transmitted (source bits) are at first de-multiplexed by a S/P (serial/parallel) unit 102 into two parallel streams of data.

In other embodiments, the data to be transmitted is mapped into more than two parallel streams.

Each of the information bits in the two parallel streams is processed by a scrambler 103 and is FEC (forward error correction) encoded by a FEC unit 104. This is done in parallel for the two data streams, such that the transmitter 100 comprises two scramblers 103 and two FEC units 104.

The two (scrambled and FEC-encoded) parallel data streams are then processed by a 2-D Bit interleaving and mapping unit 105.

The 2-D Bit interleaving and mapping unit 105 performs interleaving in each parallel stream and performs interleaving across both parallel streams.

In this embodiment, the interleaving in each parallel stream is a two-step permutation. The first permutation ensures that adjacent coded bits are mapped onto nonadjacent subcarriers. The second permutation ensures that adjacent coded bits are mapped alternately onto less and more significant bits of the constellation and, thereby, long runs of low reliability bits (LSB) are avoided.

The interleaving across both parallel streams is for example carried out according to the following.

Let $N_S=96$ denote the number of data symbols in one block of the parallel data streams (note that the parallel streams are subdivided into data symbols and blocks of data symbols). Let further $N_T$ denote the number of transmit antennas, in this case $N_T=2$.

$T_i(k)$ where $i=1, \ldots, N_T$ and $k=1, 2, \ldots, N_S$ denotes the mapped symbol before symbol interleaving at parallel stream i, data symbol k, and $S_m(n)$ where $i=1, \ldots, N_T$ and $k=1, 2, \ldots, N_S$ denotes the symbol after symbol interleaving at stream m, data symbol n.

The symbol interleaver defines the mapping operation from $T_i(k)$ to $S_m(n)$ where the (stream, symbol) index pair after interleaving (m,n) is generated according to $$m=\lfloor (k-1)/(N_S/N_T) \rfloor +1$$

$$n=1+(N_T(k-1)+(i-1)) \bmod N_S.$$

A receiver corresponding to the transmitter 100 comprises a de-interleaver that removes the interleaving across the two parallel streams and accordingly carries out the inverse mapping operation from $S_m(n)$ to $T_i(k)$ that is given by $$i=1+(n-1) \bmod N_T$$

$$k=(m-1)N_S/N_T+\lfloor (n-1)/N_T \rfloor +1.$$

This interleaver is chosen when convolutional code is chosen for FEC. When LDPC (low-density parity check) is used for forward error correction, the interleaver differs from the one given above.

After interleaving, the 2-D Bit interleaving and mapping unit 105 maps the data contained in the interleaved parallel streams onto data symbols, such that two streams of data symbols are generated.

The two streams of data symbols are supplied to a 2-D pre-transform unit 106, which is explained in the following with reference to FIG. 2.

Figure 2:
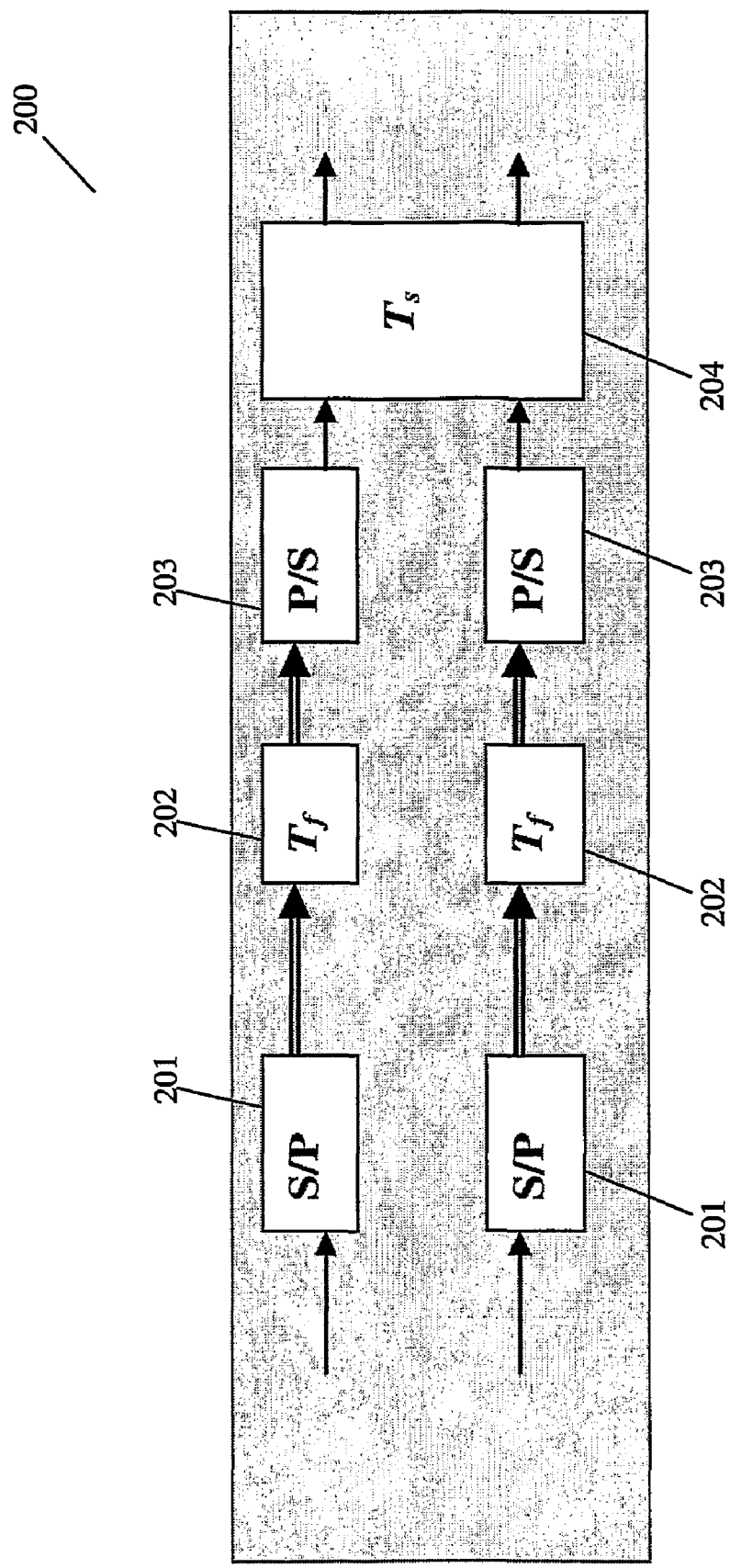
FIG. 2 shows a 2-D pre-transform unit according to an embodiment of the invention.

FIG. 2 shows a 2-D pre-transform unit 200 according to an embodiment of the invention.

The 2-D pre-transform unit 106 receives two streams of data symbols as input. Each stream of data symbol is converted into a block of data symbols. Let $s_1$ denote one block of data symbols (data symbol vector) of one data symbol stream, let it for example be the data symbol stream corresponding to the "upper" input in FIG. 2 and let $s_2$ denote the one block of data symbols (data symbol vector) of the other data symbol stream, i.e. the data symbol stream corresponding to the "lower" input in FIG. 2.

Each of the data symbol vectors comprises in this embodiment 96 components (equal to the number of subcarriers used for the data transmission), such that $$s_1=[s_1(1), s_1(2), \ldots, s_1(96)]^T$$

$$s_2=[s_2(1), s_2(2), \ldots, s_2(96)]^T$$

wherein the $s_i(j)$ are complex numbers. $s_1$ and $s_2$ each correspond to one OFDM symbol.

$s_1$ and $s_2$ are each supplied to a respective first multiplication unit 202 by which $s_1$ and $s_2$ are multiplied with a matrix $T_f$.

$T_f$ can be chosen according to different transforms. One example transform is the Walsh-Hadamard transform. ($T_f$ according to a Walsh-Hadamard transform (according to this example of order 96) can be generated from the order-8 Hadamard matrix $$T_8 = \sqrt{\frac{1}{8}} \times \begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix}$$

and order-12 Hadamard matrix $$T_{12} = \sqrt{\frac{1}{12}} \times \begin{bmatrix} 1 & 1 & 1 & 1 & 1 & 1 & 1 & 1 & 1 & 1 & 1 & 1 \\ 1 & -1 & 1 & -1 & 1 & 1 & 1 & -1 & -1 & -1 & 1 & -1 \\ 1 & -1 & -1 & 1 & -1 & 1 & 1 & 1 & -1 & -1 & -1 & 1 \\ 1 & 1 & -1 & -1 & 1 & -1 & 1 & 1 & 1 & -1 & -1 & -1 \\ 1 & -1 & 1 & -1 & -1 & 1 & -1 & 1 & 1 & 1 & -1 & -1 \\ 1 & -1 & -1 & 1 & -1 & -1 & 1 & -1 & 1 & 1 & 1 & -1 \\ 1 & -1 & -1 & -1 & 1 & -1 & -1 & 1 & -1 & 1 & 1 & 1 \\ 1 & 1 & -1 & -1 & -1 & 1 & -1 & -1 & 1 & -1 & 1 & 1 \\ 1 & 1 & 1 & -1 & -1 & -1 & 1 & -1 & -1 & 1 & -1 & 1 \\ 1 & 1 & 1 & 1 & -1 & -1 & -1 & 1 & -1 & -1 & 1 & -1 \\ 1 & -1 & 1 & 1 & 1 & -1 & -1 & -1 & 1 & -1 & -1 & 1 \\ 1 & 1 & -1 & 1 & 1 & 1 & -1 & -1 & -1 & 1 & -1 & -1 \end{bmatrix}$$

by performing the Kronecker product as $$T_f = T_8 \otimes T_{12}$$

$T_f$ can also be chosen according to $$T_f = F \times \begin{bmatrix} 1 & 0 & 0 & \cdots & & 0 \\ 0 & \alpha & 0 & & & 0 \\ 0 & 0 & \alpha^2 & & & 0 \\ \vdots & \vdots & \vdots & \ddots & & \vdots \\ \vdots & \vdots & \vdots & & \ddots & \\ 0 & 0 & 0 & \cdots & \cdots & \alpha^{N_S-1} \end{bmatrix}$$

where F is the FFT matrix of size $N_S$ and $\alpha=\exp(-j\pi/2N_S)$.

Each block of data symbols, multiplied by the matrix $T_f$ is then supplied to a respective P/S unit 203 where it is mapped to a stream of data symbols. The streams of data symbols generated in this way are both fed to a second multiplication unit 204.

The second multiplication unit 204 performs a multiplication with a matrix $T_s$, such that altogether, the 2-D pre-transform unit 106 generates two vectors $y_1$ and $y_2$ according to $$\underline{y} = \begin{bmatrix} \underline{y}_1 \\ \underline{y}_2 \end{bmatrix} = T \begin{bmatrix} \underline{s}_1 \\ \underline{s}_2 \end{bmatrix}$$

where the 2-D transform matrix T can be written as $$T = \underbrace{\begin{bmatrix} T_{s,0} & 0 & 0 & 0 \\ 0 & T_{s,1} & 0 & 0 \\ 0 & 0 & \ddots & 0 \\ 0 & 0 & 0 & T_{s,N-1} \end{bmatrix}}_{T_s} P \begin{bmatrix} T_f & 0 \\ 0 & T_f \end{bmatrix}.$$

and P is the $n_T N$-by-$n_T N$ permutation matrix, with its elements having the following values:

$$P_{i,j} = \begin{cases} 1, & \text{when } j = \left[\dfrac{i}{n_T}\right] + (i \bmod n_T) \times N \\ 0, & \text{otherwise} \end{cases} \quad i, j = 0, 1, \ldots, n_T N - 1.$$

The transform matrix $T_s$ is a square matrix when the number of streams at the output is the same as that at the input (as it is the case in this example).

When there are more streams at the output than that at the input, transform matrix $T_s$ is a rectangular matrix having more rows than columns. The row number is the same as the output stream number, and the column number is the same as the input stream number. The columns shall be orthonormal.

When $T_s$ is not generated from the channel knowledge, it can take the following format $$\underline{T}_{s,k} = \underbrace{\operatorname{diag}(1, e^{j\varphi_{1,k}}, \ldots, e^{j\varphi_{n_T,k}})}_{D_k} \underline{S} \quad k = 0, 1, 2, \ldots, N-1$$

where N is the number of subcarriers per OFDM symbol, S is either a square unitary matrix or a rectangular matrix with orthonormal columns, and $\phi_k$ can take different values for the different subcarriers.

$T_s$ can also be generated from the channel knowledge.
The multiplication of $$\begin{bmatrix} \underline{s}_1 \\ \underline{s}_2 \end{bmatrix}$$

by the transformation matrix T effects a pre-transformation in the spatial domain and the frequency domain (therefore denoted by 2D pre-transformation).

Figure 3:
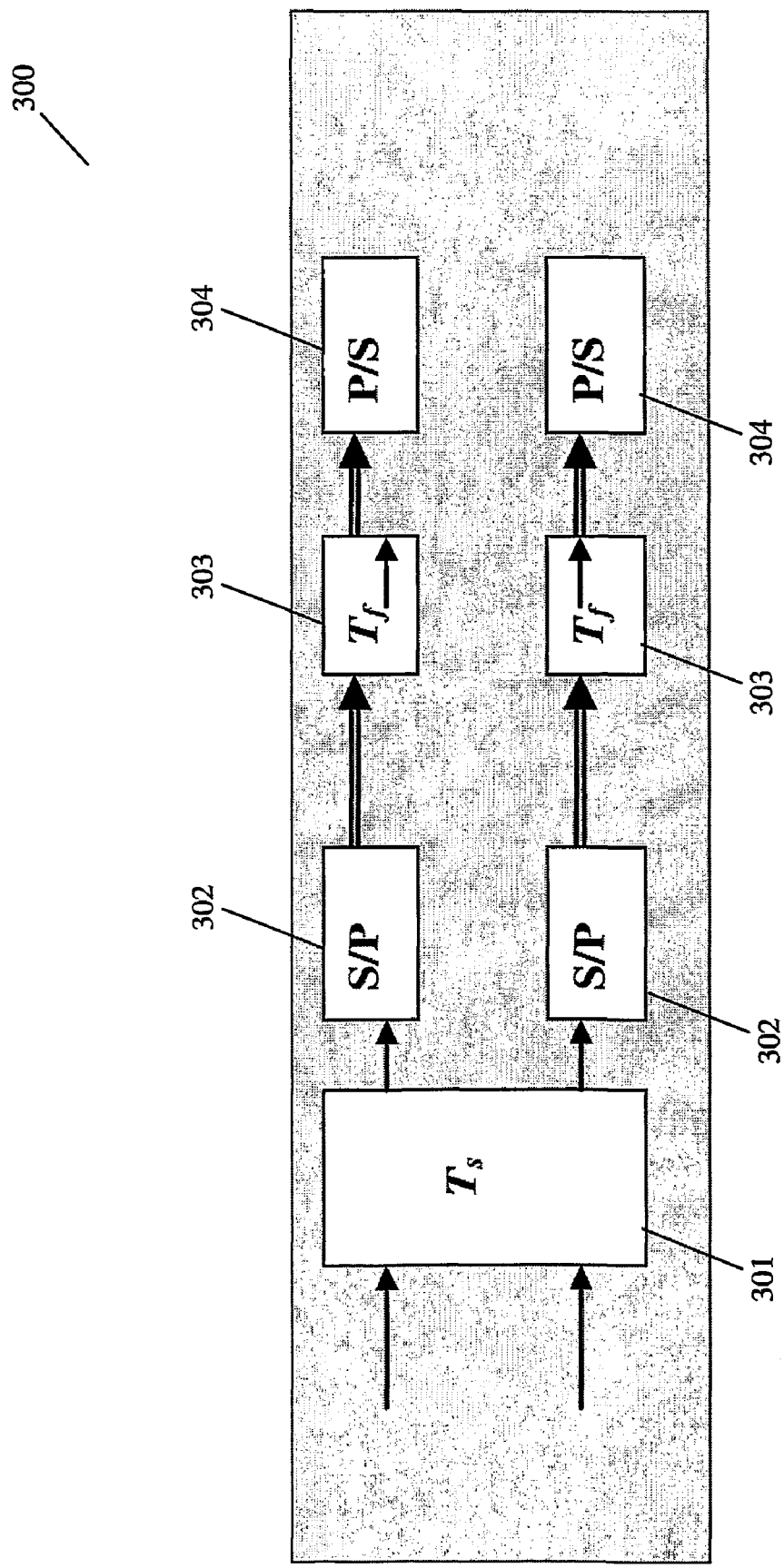
FIG. 3 shows a 2-D pre-transform unit according to an embodiment of the invention.

The multiplication by the matrices $T_f$ and $T_s$ that is performed by the 2-D Pre-transform unit 200 can also take place in different order, as it is shown in FIG. 3.

FIG. 3 shows a 2-D pre-transform unit 300 according to an embodiment of the invention.

The functionality of the 2-D pre-transform unit 300 is similar to the functionality of the 2-D pre-transform unit 200 shown in FIG. 2, but the input is first processed by the second multiplication unit 301 and the two data streams generated by the second multiplication unit 301 are (after being mapped to blocks by a respective S/P unit 302) processed by the respective first multiplication unit 303.

Altogether, the 2-D pre-transform unit 106 generates two vectors $y_1$ and $y_2$, which are mapped to corresponding symbol streams by a respective P/S unit 304, wherein $$\underline{y} = \begin{bmatrix} \underline{y}_1 \\ \underline{y}_2 \end{bmatrix} = T \begin{bmatrix} \underline{s}_1 \\ \underline{s}_2 \end{bmatrix}$$

where the 2-D transform matrix T can be written as $$T = \begin{bmatrix} T_f & 0 \\ 0 & T_f \end{bmatrix} P \underbrace{\begin{bmatrix} T_{s,0} & 0 & 0 & 0 \\ 0 & T_{s,1} & 0 & 0 \\ 0 & 0 & \ddots & 0 \\ 0 & 0 & 0 & T_{s,N-1} \end{bmatrix}}_{T_s}$$

Where P is an $n_T N$-by-$n_T N$ permutation matrix, with its elements having the following values:

$$P_{i,j} = \begin{cases} 1, & \text{when } j = \left[\dfrac{i}{N}\right] + (i \bmod N) \times n_T \\ 0, & \text{otherwise} \end{cases} \quad i, j = 0, 1, \ldots, n_T N - 1.$$

As above, $T_s$ can also be generated from the channel knowledge or independent of the channel knowledge. When the number of streams to be transmitted is the same as the number of antennas, $T_s$ is a square unitary matrix. When there are more transmit antennas than the number of data streams, it is a rectangular matrix with orthonormal columns.

The output of the 2-D Pre-transform unit 106, i.e. symbol streams corresponding to the vectors $y_1$ and $y_2$, are each used for OFDM modulation by a respective OFDM unit 107, wherein inverse Fast Fourier Transform (IFFT) and cyclic prefix (CP) insertion is performed.

Figure 4:
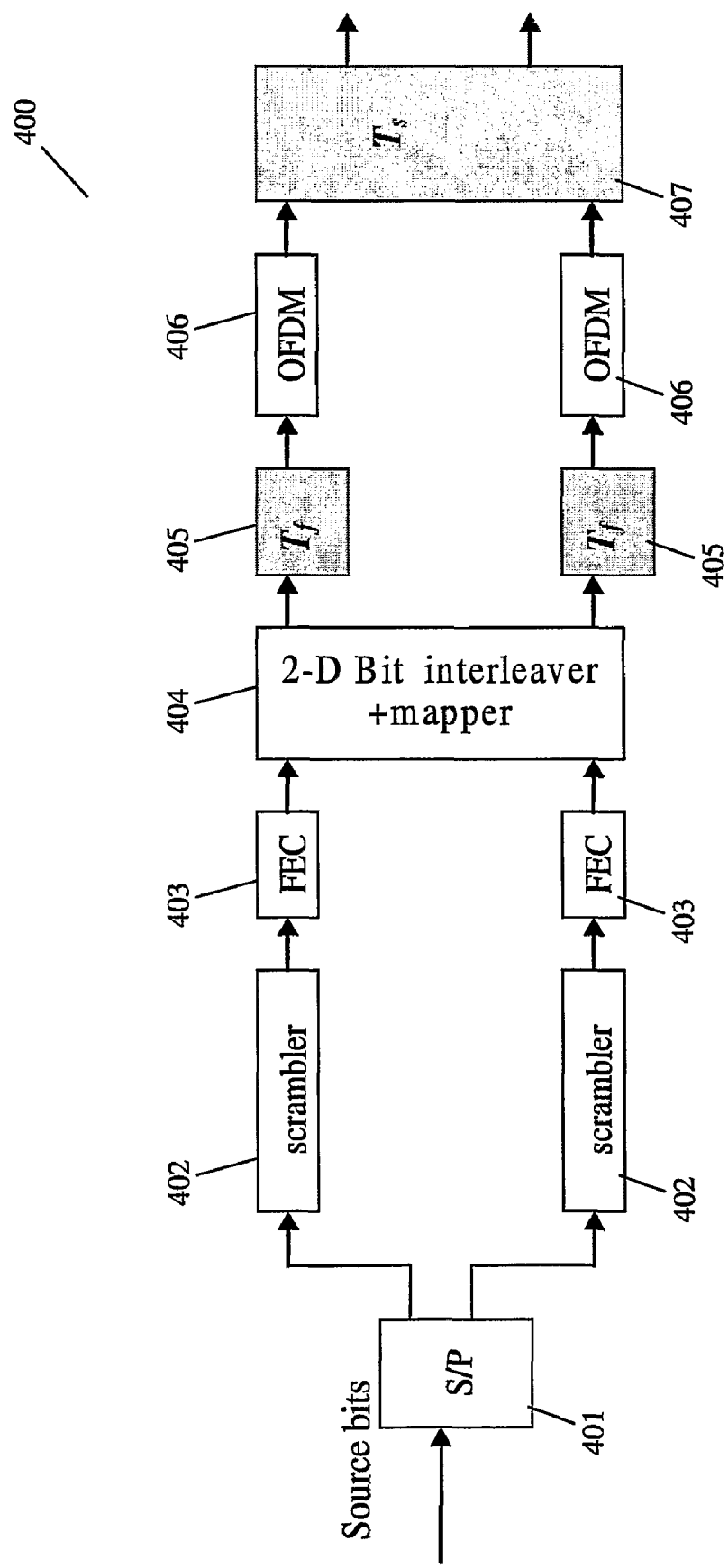
FIG. 4 shows a transmitter according to an embodiment of the invention.

An alternative embodiment is shown in FIG. 4.

FIG. 4 shows a transmitter 400 according to an embodiment of the invention.

The functionality of the S/P unit 401, the scramblers 402, the FEC units 403 and the 2-D Bit interleaving and mapping unit 404 is the same as the one of the corresponding units of the embodiment described above with reference to FIG. 1.

In contrast to the embodiment described with reference to FIG. 1, the OFDM modulation is carried out by the OFDM units 406 in between of the processing by the respective first multiplication unit 405 (that performs multiplication by $T_f$) and the processing by the second multiplication unit 407 (that performs multiplication by $T_s$).

In this case, the spatial domain transform (corresponding to $T_s$) can be the same for each data symbol in one OFDM block. Note that no unified 2-D transform matrix T can be worked out as there is a OFDM modulation between the frequency domain transform (corresponding to $T_f$) and the spatial domain transform.

In the following, an embodiment is explained wherein the 2D-transform takes place before the data streams are separated for transfer by different antennas.

Figure 5:
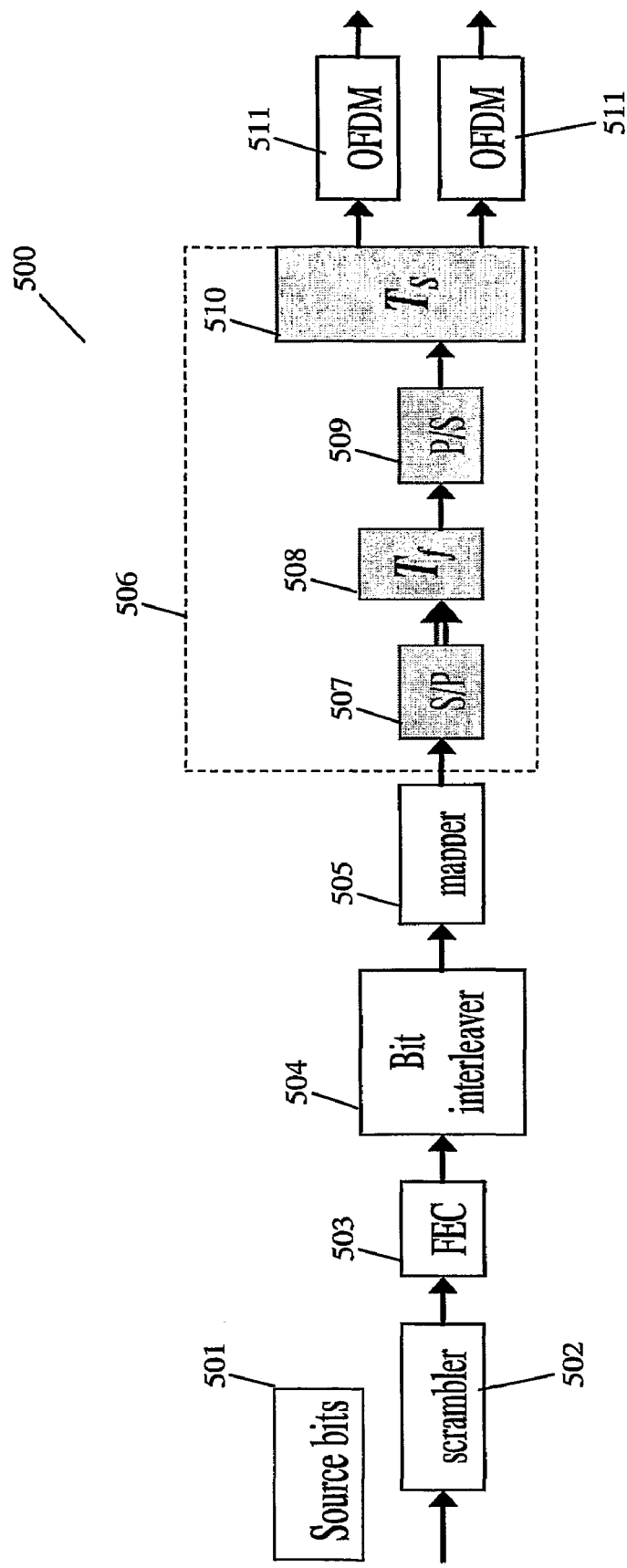
FIG. 5 shows a transmitter according to an embodiment of the invention.

FIG. 5 shows a transmitter 500 according to an embodiment of the invention.

The data 501 to be transmitted (source bits) are processed by a scrambler 502, an FEC unit 503 and a Bit interleaver 504. A mapper 505 maps the data 501 to be transmitted to a stream of modulation symbols, in this example to modulation symbols suitable for modulating the subcarriers transmitted by two antennas according to an OFDM modulation. The stream of modulation symbols is fed to a 2-D Pre-transform unit 506.

The stream of modulation symbols are first mapped into blocks of modulation symbols by a S/P unit 507. Each block of modulation symbols is processed by a first multiplication unit 508 that performs a multiplication of each block of modulation symbols by a matrix $T_f$. $T_f$ is a unitary matrix and can be chosen as described-above.

The blocks of modulation symbols processed by the first multiplication unit 508 are processed by a P/S unit 509 and a second multiplication unit 510 which performs a multiplication by a matrix $T_s$, which, using the above denotations, is for example given by $$T_{s,k} = \begin{bmatrix} 1 \\ e^{j\varphi_k} \end{bmatrix} k = 0, 1, 2, \ldots, N-1$$

Altogether, similar to above, the processing of the 2-D Pre-transform unit 506 corresponds a matrix T which can in this example be written as $$T = \begin{bmatrix} T_f \\ & DT_f \end{bmatrix}, D = \mathrm{diag}(1, e^{j\varphi_1}, \ldots, e^{j\varphi_{N-1}})$$

$T_s$ can also be given by $$T_{s,k} = \begin{bmatrix} \alpha_{1,k} \\ \alpha_{2,k} \end{bmatrix} k = 0, 1, 2, \ldots, N-1$$

with angles $\alpha_{i,k}$. In this case, the 2-D transform matrix T is given by $$T = \begin{bmatrix} D_1 T_f \\ & D_2 T_f \end{bmatrix}, D_s = \mathrm{diag}(\alpha_{s,1}, \alpha_{s,2}, \ldots, \alpha_{s,N-1}), s = 1, 2$$

The output of the 2-D Pre-transform unit 506 is a vector of dimension 2N (compare the dimension of the matrix T). The output vector is separated into two blocks of dimension N and each block is fed to a respective OFDM unit 511.

Between the 2-D Pre-transform unit 506 and the OFDM unit 511, there is in one embodiment a STBC unit such that the output of the 2-D Pre-transform unit 506 is STBC coded before it is used for OFDM modulation. Alternatively, STBC encoding is performed after OFDM modulation. Note that this embodiment is for example used when the channel conditions deteriorate and STBC is used to improve the signal link quality. Only one stream of data is processed and no data rate is gained through the MIMO structure in this case. Since in this embodiment, there are two antennas, the architecture would be a 2×2 STBC PT-FEC-OFDM.

In one embodiment, the transmitter has a 4×2 GSTBC (group-wise STBC) PT-FEC-OFDM architecture. In this case, four antennas would be provided that are used to transmit two parallel streams, wherein each stream is transmitted according to 2×2 STBC PT-FEC-OFDM. Therefore, the data rate attained is the same as the 2×2 SM PT-FEC-OFDM (see the embodiment described with reference to FIG. 1, but transmit diversity is achieved. A transmitter according to this embodiment would have the structure of the transmitter shown in FIG. 1 but each of the OFDM units 107 would be coupled with a STBC unit such that from the output of each OFDM unit 107, two data streams are generated. The resulting four data streams are then transferred simultaneously.

Figure 6:
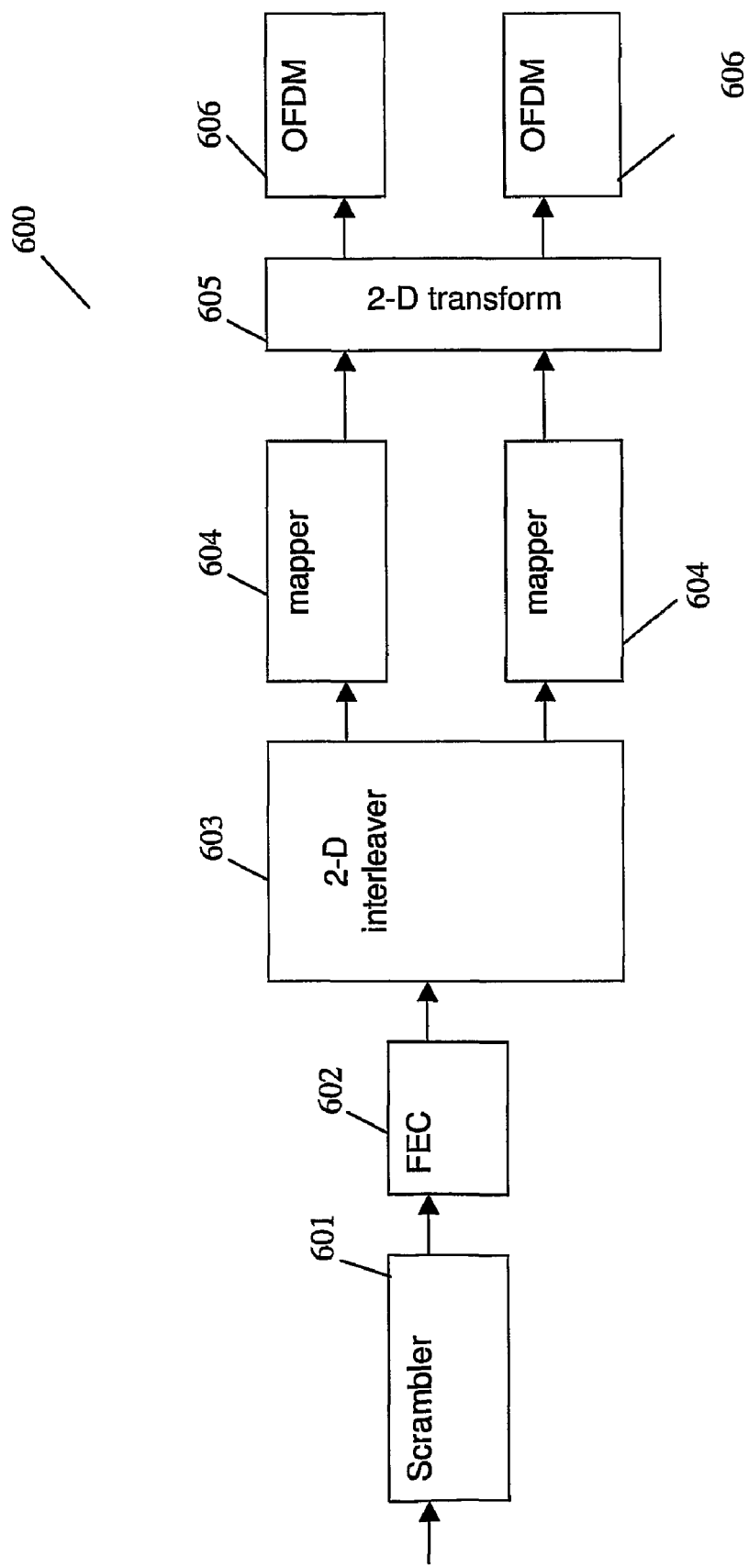
FIG. 6 shows a transmitter 600 according to an embodiment of the invention.

An alternative to the transmitter 100 shown in FIG. 1 is shown in FIG. 6.

FIG. 6 shows a transmitter 600 according to an embodiment of the invention.

In contrast to the transmitter 100 shown in FIG. 1, the data to be sent (source bits) is not mapped to parallel streams before scrambling, FEC encoding and bit interleaving. Instead, the data is processed by only one scrambler 601, one FEC unit 602 and one 2-D bit interleaver 603.

The output of the 2-D bit interleaver 603 is separated into two parallel streams of data, which are each mapped to modulation symbols by a respective mapper 604.

Similar to the transmitter 100, the parallel streams of data are transformed according to a 2-D transform by a 2-D pre-transform unit 605 and each transformed parallel stream of data is used for OFDM modulation by a respective OFDM unit 606.

According to one embodiment, a receiver is used, wherein an iterative subcarrier reconstruction is performed before the PIC+MRC (parallel interference cancellation and maximal ratio combining) process. The rational behind this is that iterative reconstruction provides the PIC+MRC module with a much better estimate of the transmitted signal and hence the interference estimate. Therefore, the error propagation of the PIC+MRC module can be significantly reduced and hence, better error performance is produced. If complexity permits, the output of the PIC+MRC module can be fed back to the iterative subcarrier reconstruction module to improve the reconstruction as well. The iteration between these two modules produces even better performance.

Two different schemes can be used:

Scheme 1: Subcarrier Reconstruction+PIC+MRC

1) Perform linear ZF-IS (zero forcing interference suppression) or MMSE-IS (minimum mean squared error interference suppression).

2) For each transmit data stream, perform iterative subcarrier reconstruction for p subcarriers and q iterations on each subcarrier 3) Use the output of the subcarrier reconstruction to perform PIC+MRC for r iterations 4) Perform inverse PT on the output from PIC+MRC. Demodulate the signal and pass it to output.

Scheme 2: Iterative Subcarrier Reconstruction+PIC+MRC

1) Perform linear ZF-IS or MMSE-IS and inverse PT to obtain the estimate of the transmitted signal 2) For each transmit data stream, perform iterative subcarrier reconstruction, using the estimate of the transmitted signal from the previous step.

3) Using the output of the subcarrier reconstruction to perform PIC+MRC for r iterations, go to step 3

4) Repeat Step 3 and 4 until the iteration number exceeds the chosen value

5) Inverse PT the output form PIC+MRC. Demodulate the signal pass to output.

It should be noted that in the embodiments described in connection with the FIGS. 1 to 6, the functional blocks 103 and 104 in FIG. 1, 202 in FIG. 2, 303 in FIG. 3, 402, 403 and 405 in FIG. 4 and 604 in FIG. 6 in the respective data streams may have the same or different implementation.

In the above, the following documents are cited:

[1] G. J. Foschini, G. D. Golden, R. A. Valenzuela, and P. W. Wolnianski, "Simplified processing for high spectral efficiency wireless communication employing multi-element arrays", IEEE Journal on Selected Areas of Communications, vol. 17, No. 11, pp. 1841-1852, November 1999.

[2] Zhongding Lei, Yan Wu, Chin Keong Ho, Sumei Sun, Ping He, and Yuang Li, "Iterative detection for Walsh-Hadamard transformed OFDM", IEEE Vehicular Technology Conference Spring, 2003, pp. 637-640, vol. 1, April 2003

The invention claimed is:

1. A method for transmitting a digital data stream, comprising:
   mapping the data stream to a plurality of modulation symbols wherein;
   each modulation symbol is associated with a subcarrier of a multiplicity of subcarriers;
   the multiplicity of subcarriers comprises at least a first plurality of subcarriers and a second plurality of subcarriers;
   the subcarriers of the first plurality of subcarriers have different frequency and are sent by a first antenna and each modulation symbol that is associated with a subcarrier of the first plurality of subcarriers is also associated with the first antenna and;
   the subcarriers of the second plurality of subcarriers have different frequency and are sent by a second antenna and each modulation symbol that is associated with a subcarrier of the second plurality of subcarriers is also associated with the second antenna;
   wherein the modulation symbols are grouped into at least one block;
   transforming the modulation symbols such that a multiplicity of transformed modulation symbols is formed from the modulation symbols wherein;
      at least two modulation symbols associated with subcarriers having different frequency are and associated with a same antenna are linearly combined to form a transformed modulation symbol according to a multiplication of a block of modulation symbols by a first transformation matrix; and
      at least one modulation symbol associated with the first antenna and at least one modulation symbol associated with the second antenna are linearly combined to form a transformed modulation symbol according to a multiplication of a block of modulation symbols by a second transform matrix; and
      each transformed modulation symbol is associated with a subcarrier; and
   using each transformed modulation symbol to modulate the subcarrier associated with the transformed modulation symbol, wherein OFDM modulation is carried out in between the processing by the multiplication of a block of modulation symbols by the first transform matrix and the processing by the multiplication of a block of modulation symbols by the second transform matrix.

2. A method according to claim 1, wherein the first transform matrix is unitary.

3. A method according to claim 1, wherein the transformed modulation symbols are used for OFDM modulation of the subcarriers.

4. A method according to claim 1, wherein a forward error correction coding is carried out on the data stream before it is mapped to the modulation symbols.

5. A method according to claim 1, wherein the data stream is interleaved before it is mapped to the modulation symbols.

6. A method according to claim 1, wherein the data stream is scrambled before it is mapped to the modulation symbols.

7. A method according to claim 1, wherein an space-time block code encoding is carried out.

8. The method according to claim 1, wherein the second transform matrix is unitary.

9. A transmitter for transmitting a digital data stream, comprising:
   a mapping unit adapted to map the data stream to a plurality of modulation symbols wherein the modulation symbols are grouped into at least one block;
   an association unit adapted to associate each modulation symbol with a subcarrier of a multiplicity of subcarriers and to associate each modulation symbol with a first antenna or a second antenna; wherein
      the multiplicity of subcarriers comprises at least a first plurality of subcarriers and a second plurality of subcarriers;
      the subcarriers of the first plurality of subcarriers have different frequency and are sent by the first antenna and each modulation symbol that is associated with a subcarrier of the first plurality of subcarriers is also associated with the first antenna;
      the subcarriers of the second plurality of subcarriers have different frequency and are sent by a second antenna and each modulation symbol that is associated with a subcarrier of the second plurality of subcarriers is also associated with the second antenna;
   a transforming unit adapted to transform the modulation symbols such that a multiplicity of transformed modulation symbols is formed from the modulation symbols; wherein
      at least two modulation symbols associated with subcarriers having different frequency and associated with the same antenna are linearly combined to form a transformed modulation symbol according to a multiplication of a block of modulation symbols by a first transformation matrix; and
      at least one modulation symbol associated with the first antenna and at least one modulation symbol associated with the second antenna are linearly combined to form a transformed modulation symbol according to a multiplication of a block of modulation symbols by a second transform matrix; and
      each transformed modulation symbol is associated with a subcarrier; and
   a modulating unit adapted to use each transformed modulation symbol for modulating the subcarrier associated with the transformed modulation symbol, wherein OFDM modulation is carried out in between the processing by the multiplication of a block of modulation symbols by the first transform matrix and the processing by the multiplication of a block of modulation symbols by the second transform matrix.

10. A method for transmitting a digital data stream, comprising:
   mapping the data stream to a plurality of modulation symbols, wherein
   each modulation symbol is associated with a subcarrier of a multiplicity of subcarriers, the multiplicity of subcarriers comprises at least a first plurality of subcarriers and a second plurality of subcarriers, the subcarriers of the first plurality of subcarriers have different frequency and are sent by a first antenna, and each modulation symbol that is associated with a subcarrier of the first plurality of subcarriers is also associated with the first antenna, and the subcarriers of the second plurality of subcarriers have different frequency and are sent by a second antenna, and each modulation symbol that is associated with a subcarrier of the second plurality of subcarriers is also associated with the second antenna, wherein the modulation symbols are grouped into at least one block, transforming the modulation symbols such that a multiplicity of transformed modulation symbols is formed from the modulation symbols wherein at least two modulation symbols associated with sub-carriers having different frequency and associated with a same antenna are linearly combined to form a transformed modulation symbol according to a multiplication of a block of modulation symbols by a first transform matrix; and at least one modulation symbol associated with the first antenna and at least one modulation symbol associated with the second antenna are linearly combined to form a transformed modulation symbol according to a multiplication of a block of modulation symbols by a second transform matrix; and each transformed modulation symbol is associated with a subcarrier;

using each transformed modulation symbol to modulate the subcarrier associated with the transformed modulation symbol, wherein the processing by the multiplication of a block of modulation symbols by the first transform matrix is carried out before the processing by the multiplication of a block of modulation symbols by the second transform matrix.

11. A method for transmitting a digital data stream, comprising:

mapping the data stream to a plurality of modulation symbols, wherein each modulation symbol is associated with a subcarrier of a multiplicity of subcarriers, the multiplicity of subcarriers comprises at least a first plurality of subcarriers and a second plurality of subcarriers, the subcarriers of the first plurality of subcarriers have different frequency and are sent by a first antenna, and each modulation symbol that is associated with a subcarrier of the first plurality of subcarriers is also associated with the first antenna, and the subcarriers of the second plurality of subcarriers have different frequency and are sent by a second antenna, and each modulation symbol that is associated with a subcarrier of the second plurality of subcarriers is also associated with the second antenna, wherein the modulation symbols are grouped into at least one block, transforming the modulation symbols such that a multiplicity of transformed modulation symbols is formed from the modulation symbols wherein at least two modulation symbols associated with sub-carriers having different frequency and associated with a same antenna are linearly combined to form a transformed modulation symbol according to a multiplication of a block of modulation symbols by a first transform matrix; and at least one modulation symbol associated with the first antenna and at least one modulation symbol associated with the second antenna are linearly combined to form a transformed modulation symbol according to a multiplication of a block of modulation symbols by a second transform matrix; and each transformed modulation symbol is associated with a subcarrier;

using each transformed modulation symbol to modulate the subcarrier associated with the transformed modulation symbol, Wherein the processing by the multiplication of a block of modulation symbols by the second transform matrix is carried out before the processing by the multiplication of a block of modulation symbols by the first transform matrix.

12. Transmitter for transmitting a digital data stream, comprising:

a mapping unit adapted to map the data stream to a plurality of modulation symbols wherein the modulation symbols are grouped into at least one block;

an association unit adapted to associate each modulation symbol with a subcarrier of a multiplicity of subcarriers, and to associate each modulation symbol with a first antenna or a second antenna, wherein the multiplicity of subcarriers comprises at least a first plurality of subcarriers and a second plurality of subcarriers, the subcarriers of the first plurality of subcarriers have different frequency and are sent by the first antenna, and each modulation symbol that is associated with a subcarrier of the first plurality of subcarriers is also associated with the first antenna;

the subcarriers of the second plurality of subcarriers have different frequency and are sent by the second antenna, and each modulation symbol that is associated with a subcarrier of the second plurality of subcarriers is also associated with the second antenna;

a transforming unit adapted to transform the modulation symbols such that a multiplicity of transformed modulation symbols is formed from the modulation symbols wherein at least two modulation symbols associated with sub-carriers having different frequency and associated with a same antenna are linearly combined to form a transformed modulation symbol according to a multiplication of a block of modulation symbols by a first transform matrix; and at least one modulation symbol associated with the first antenna and at least one modulation symbol associated with the second antenna are linearly combined to form a transformed modulation symbol according to a multiplication of a block of modulation symbols by a second transform matrix; and each transformed modulation symbol is associated with a subcarrier a modulating unit adapted to use each transformed modulation symbol for modulating the subcarrier associated with the transformed modulation symbol, wherein the processing by the multiplication of a block of modulation symbols by the first transform matrix is carried out before the processing by the multiplication of a block of modulation symbols by the second transform matrix.

13. Transmitter for transmitting a digital data stream, comprising:

a mapping unit adapted to map the data stream to a plurality of modulation symbols wherein the modulation symbols are grouped into at least one block;

an association unit adapted to associate each modulation symbol with a subcarrier of a multiplicity of subcarriers, and to associate each modulation symbol with a first antenna or a second antenna, wherein the multiplicity of subcarriers comprises at least a first plurality of subcarriers and a second plurality of subcarriers;

the subcarriers of the first plurality of subcarriers have different frequency and are sent by the first antenna, and each modulation symbol that is associated with a subcarrier of the first plurality of subcarriers is also associated with the first antenna;

the subcarriers of the second plurality of subcarriers have different frequency and are sent by the second antenna, and each modulation symbol that is associated with a subcarrier of the second plurality of subcarriers is also associated with the second antenna;

a transforming unit adapted to transform the modulation symbols such that a multiplicity of transformed modulation symbols is formed from the modulation symbols wherein at least two modulation symbols associated with sub-carriers having different frequency and associated with a same antenna are linearly combined to form a transformed modulation symbol according to a multiplication of a block of modulation symbols by a first transform matrix; and at least one modulation symbol associated with the first antenna and at least one modulation symbol associated with the second antenna are linearly combined to form a transformed modulation symbol according to a multiplication of a block of modulation symbols by a second transform matrix; and each transformed modulation symbol is associated with a subcarrier;

a modulating unit adapted to use each transformed modulation symbol for modulating the subcarrier associated with the transformed modulation symbol, wherein the processing by the multiplication of a block of modulation symbols by the second transform matrix is carried out before the processing by the multiplication of a block of modulation symbols by the first transform matrix.

\* \* \* \* \*